June 4, 1929.  R. O. BEARDSLEY  1,715,813
MOUNTING FOR SCREWS AND TAPS
Filed June 11, 1927   3 Sheets-Sheet 1
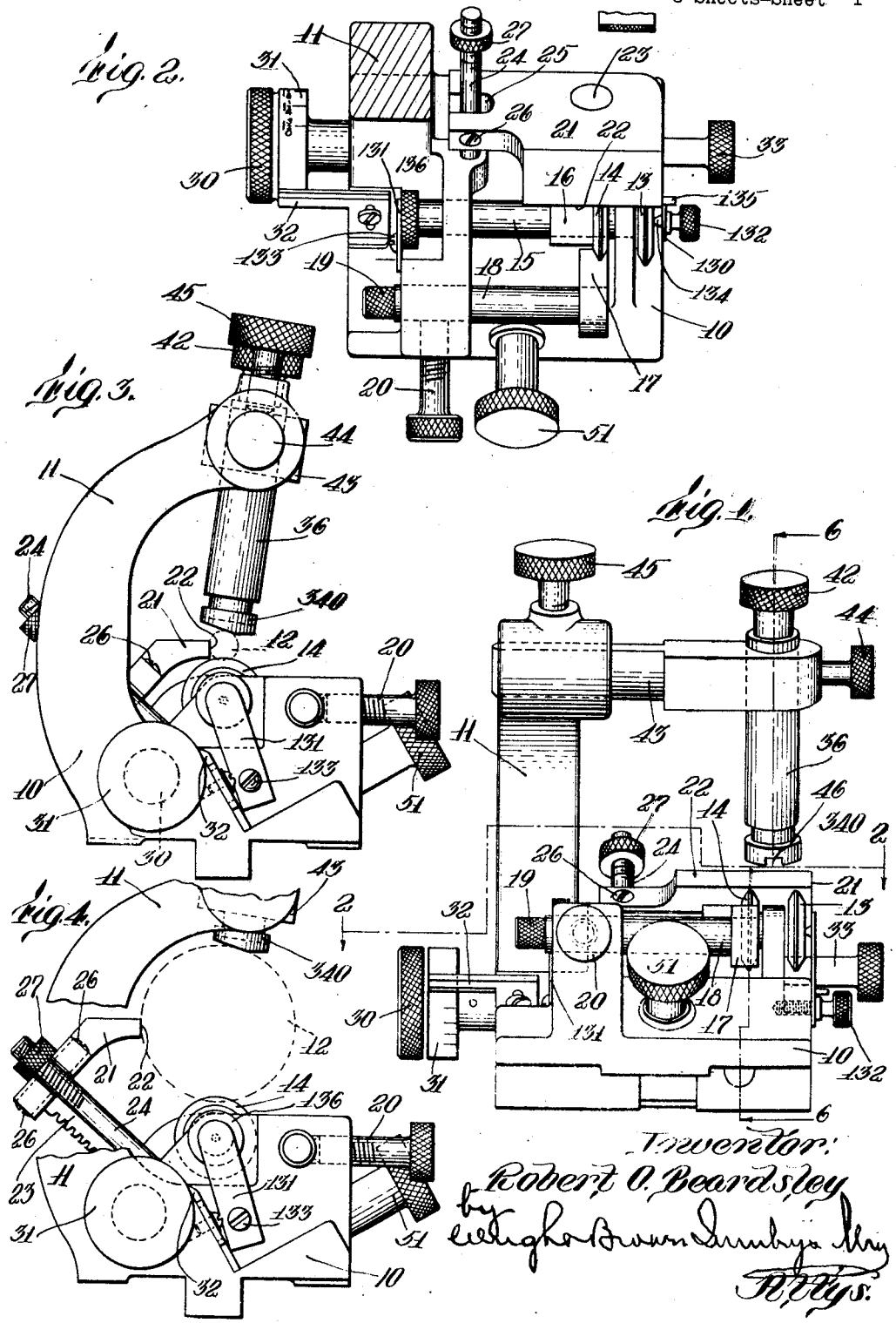

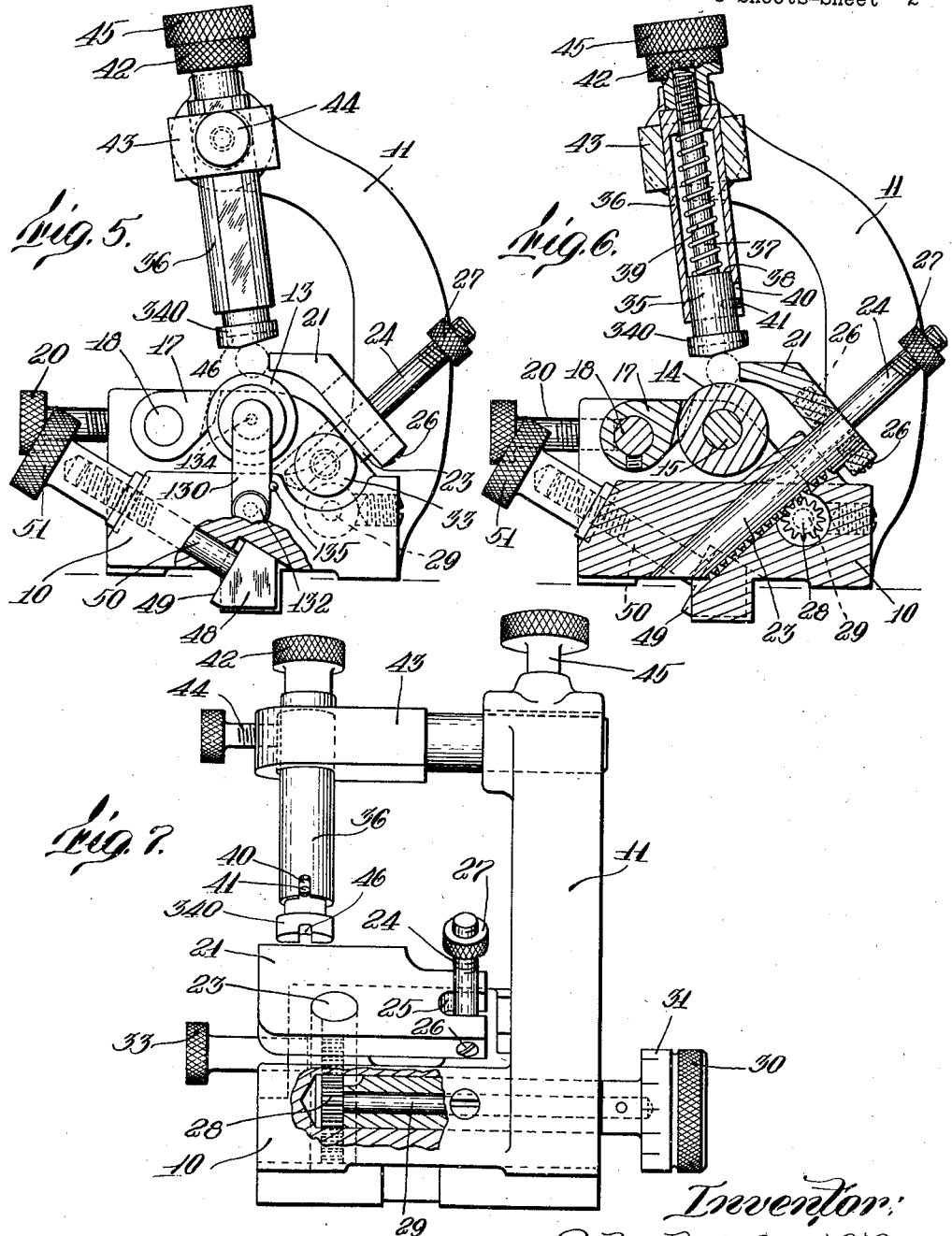

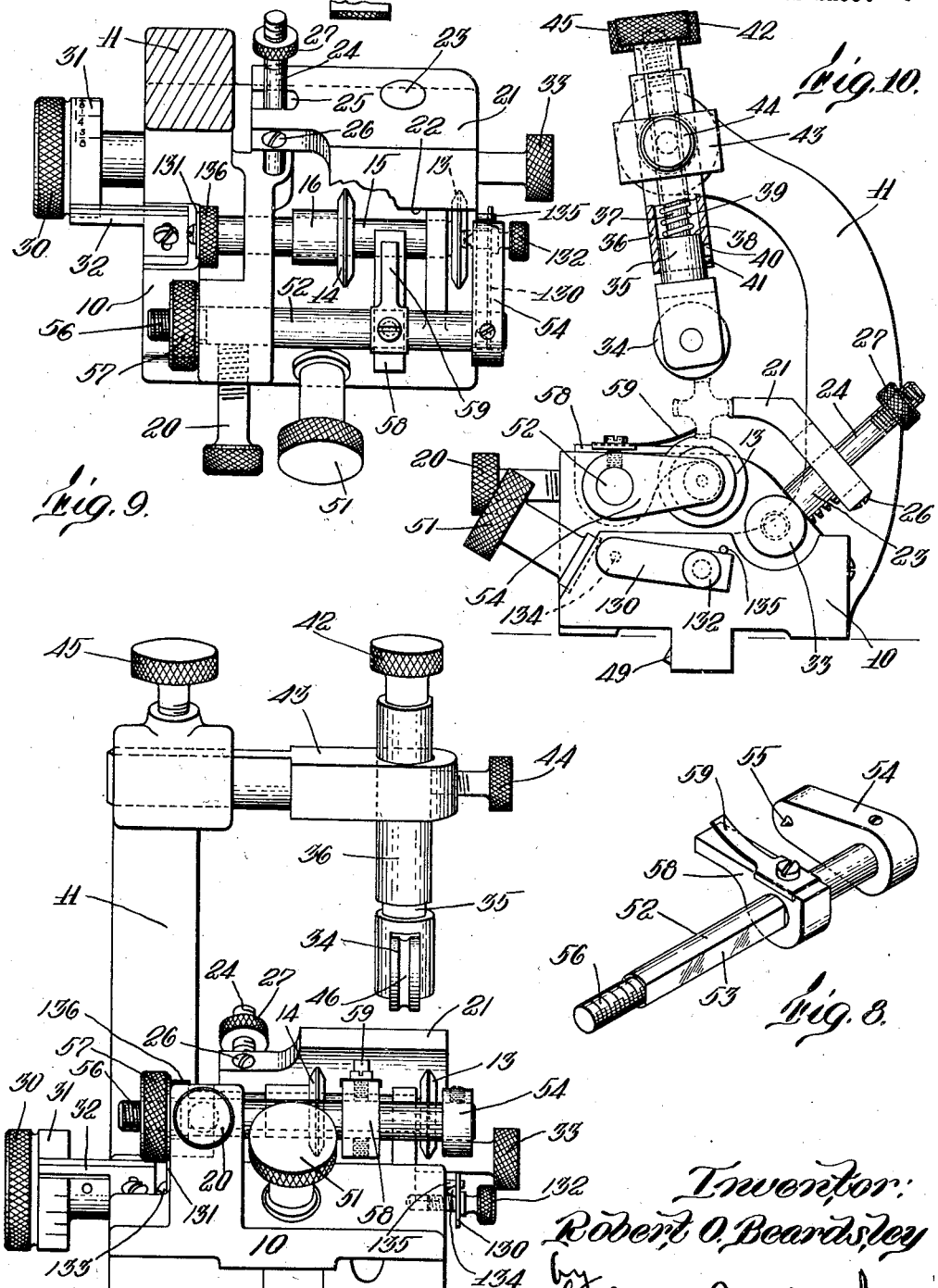

Patented June 4, 1929.

1,715,813

UNITED STATES PATENT OFFICE.

ROBERT O. BEARDSLEY, OF SPRINGFIELD, VERMONT, ASSIGNOR TO JONES & LAMSON MACHINE COMPANY, OF SPRINGFIELD, VERMONT, A CORPORATION OF VERMONT.

MOUNTING FOR SCREWS AND TAPS.

Application filed June 11, 1927. Serial No. 198,094.

This invention relates to mountings or cradles for holding screws and taps in a definite position for examination of their threads or for any other purpose requiring a definite positioning of the screw or tap. An object of the invention is to provide a mounting which is easily adjustable to receive screws of different sizes and which can be operated with more facilitiy than the mountings which have heretofore been used.

My improved cradle is more particularly designed for use with a comparator such as is shown and described in the patent to Hartness, No. 1,377,068, granted May 3, 1921, or such as is shown and described in the application of Hartness et al Patent No. 1,703,933, March 5, 1929. In either case, the comparator comprises means for projecting a beam of light tangentially transverse to a screw thread so as to cast on a screen a magnified outline image of the thread. By holding a master gage in the optical path of the beam and marking the screen or arranging a previously marked screen in conformity to its outline image, the screws to be tested may be put in the place of the master gage and their outlines compared with the marks on the screen, the relative positions of the image and marks showing at a glance the characteristics and errors of the screw thread. In actual practice, charts are made with marks indicating magnified outlines of perfect screw threads of various kinds. In preparing the comparator for use, a card showing the desired outline is inserted, and the projected image of the master gage is made to fit the outline indicated on the chart by adjusting the position of the master gage and the beam of light. In order to obtain a true comparison of each screw with the master gage, it is essential that it be located accurately with respect to the beam of light in the same position as that previously occupied by the master gage. It is also important from the standpoint of economy that the cradle be constructed to receive the work and to position it accurately with the least possible expenditure of time and energy on the part of the operator.

These and other advantages in my improved mounting will be apparent to one skilled in the art from the disclosure thereof in the following description and on the drawings of which,—

Figure 1 is a front elevation of an embodiment of my invention.

Figure 2 is a section on the line 2—2 of Figure 1.

Figure 3 is an end elevation of the apparatus.

Figure 4 is a similar end elevation showing the apparatus used with work of a larger diameter.

Figure 5 is an elevation of the end opposite to that shown in Figures 3 and 4.

Figure 6 is a partial section on the line 6—6 of Figure 1.

Figure 7 is a rear elevation of the apparatus.

Figure 8 is a perspective view of an attachment for use with the apparatus when inspecting taps.

Figure 9 is a plan view of the apparatus showing the attachment for taps in place.

Figures 10 and 11 are end and rear elevations respectively of the apparatus with the attachment for taps, these figures also showing a modified form of screw-engaging member.

Referring to the drawings in detail, 10 represents the base portion of a framework on which the various members of the apparatus are mounted. As shown, the base 10 is a casting having a standard 11 extending upwardly therefrom and curving forwardly. The screw or tap which is indicated at 12 is supported when in position for observation by a pair of disk rollers 13, 14, these rollers preferably having beveled peripheral portions to enter between successive turns of the thread of the screw placed thereon. Since the usual screw thread is cut with a 60° valley between the threads, the peripheral portions of the rollers 13, 14 are preferably beveled to that angle, the bevels being spaced by a peripheral flat instead of coming together to form a sharp edge, in order to insure that the beveled faces will engage the sides instead of the bottom of a valley. The pitch of screws and taps is subject to error in lead, hence it is preferred that one of the rollers be axially movable relative to the other so that both can fit snugly into a valley between turns of the screw thread. Since, however, it is an object of the apparatus to position the work in such a way that one portion of the threaded part of the work will be definitely located with reference to the optical path of the beam of light by which a shadow outline of a portion of the thread is thrown upon a screen, one of the rollers must be held against axial movement. There are of course several ways of mounting the rollers to secure the desired freedom of motion for each. As shown on the drawing, the roller 13 may be made integral with a shaft or stem 15 which is journaled in the base 10, permitting the roller 13 to rotate freely and to slide axially. The roller 13 is preferably fixed to or formed on an end of the shaft 15. By this construction, screws or bolts having large heads may be supported by the rollers 13 and 14 with their heads close up to the roller 13, thus permitting an inspection of the thread through practically all of its length. The roller 14 may be formed with a cylindrical hub member 16, the bore of which receives the stem 15 with a sliding fit so that the roller 14 is thus coaxially mounted with the roller 13 and the two rollers may thus rotate or slide axially independently of each other. In order to hold the roller 14 adjustably against axial movement, I provide a suitable fork 17, the end of which is shaped to fit a portion of the beveled periphery of the roller 14. The fork 17 is fixed on a rock shaft 18 which is journaled in the base 10 and is provided with a knurled end 19 by which the fork 17 may be swung into or out of engagement with the periphery of the roller 14. The fork 17 and the shaft 18 on which it is fixed may be secured in adjusted position as by a set screw 20 which bears against the shaft 18. When setting up the apparatus for operation, the set screw 20 is backed off and the roller 14 is axially adjusted to the desired position. The shaft 18 is then rocked until the end of the fork 17 lightly engages the beveled faces of the periphery of the roller 14, this engagement being sufficient to hold the roller against axial movement but not sufficiently tight to prevent rotation thereof. The set screw 20 is thereupon set up tightly to hold the fork 17 in adjusted position. The upper peripheral portion of the roller 14 is thus a point of reference in a definite relation to the beam of light which is projected across a portion of the work laterally spaced from that which is engaged by the roller 14. When a screw-threaded object is placed upon the roller 14, the roller 13 being free to slide axially will adjust itself to enter and engage in a valley between turns of the screw thread regardless of any error which may be present in the pitch lead of the work. In order to hold the roller 13 resiliently in position, light leaf springs 130, 131 may be secured to the base 10 as by screws 132, 133 respectively. The spring 130 is arranged to bear lightly against the face of the roller 13 and is preferably provided with a bearing point 134 which may be arranged to engage the face of the roller 13 at or near the axis of the roller. In order to permit ready removal of the spring 130 from the roller 13, the screw 132 may be provided with a suitable knurled head. A stop pin 135 may be provided to center the bearing point 134 on the face of the roller 13 (Figure 5) when the spring is in operative position, and to hold the spring in convenient inoperative position (Figure 10). The spring 131 is arranged to bear lightly against the end face of the stem 15 which is remote from the roller 13. On this end of the stem may be fixed a finger piece 136 to facilitate manipulation of the stem 15 and the roller 13. The work when in its proper place on the apparatus is preferably directly above the rollers 13, 14 on which it rests. To facilitate the placing of the work in this position, a suitable back rest 21 may be provided, this back rest being shown as consisting of an elongated plate having a face 22 presented to the rear side of the work. In order to provide for work of different sizes, the plate 21 is preferably mounted for adjusting movement rearwardly and upwardly so that the face 22, as shown in Figures 3 and 4, will engage the rearmost portion of the work no matter what the diameter of the latter may be. To this end, the plate may be supported by a suitable rack 23 which is fixed thereto and which is slidably mounted in the base 10 at an angle of approximately 45° thereto. Since the back rest 21 engages the outside edges or crest of the screw while the rollers 13, 14 engage the sides of a valley in the thread at varying depths within the outside diameter depending on the depths of the valleys in screws of different sizes, the angle of inclination of the rack 23 is preferably about 42° which positions the back rest 21 in such a way as to hold screws of various sizes directly over the rollers 13, 14 unless the thread depth of the screw is abnormal for the size of the screw. In order to permit adjustment of the elongated face 22 to make it parallel to the axis of the work, a pin 24 may be mounted in the base 10 extending in a direction parallel to the rack 23. A recess 25 may be provided in one end of the plate 21 to receive the pin 24. A pair of set screws 26 are carried by the plate 21 and are arranged to project into the recess 25 and to engage opposite sides of the pin 24. By adjusting the set screws 26, the plate 21 may be rocked on the axis of the rack 23 through a limited arc to adjust the face 22 to a direction parallel to the axis of the work. A nut 27 may be threaded on to the upper end of the pin 24 to serve as a stop to limit the upward and rearward adjustment of the plate 21. The adjustment of the plate 21 may be effected by a suitable cog 28 mounted to mesh with the teeth of the rack 23. As shown the cog 28 is fixed to a shaft 29 which at its outer end carries a knurled head 30 by which it may be turned. This head may be provided with an enlarged portion 31 which can be graduated with suitable scale markings to cooperate with an index finger 32 to indicate the adjustment of the back rest 21 suitable for work of various diameters, which diameters may be indicated on the member 31. In order to hold the back rest 21 fixed in adjusted position, a set screw 33 may be set into the base 10 so that its inner end engages the rack 23 and clamps it.

In order to hold the work firmly in position against the rollers 13, 14 and the back rest 21, I provide a presser member such as a presser wheel 34 (Figures 10 and 11) or a presser foot 340 as shown in Figures 1 and 3, either of which is resiliently supported above the work and normally presses down on the upper portion thereof. The presser wheel or foot is preferably located so as to engage the work forwardly of the axis thereof. By this arrangement, the three points of contact of the rollers, the back rest, and the presser are angularly spaced about the periphery of the work (as shown in Figures 3 and 4) by angles less than 180° so that the work when placed in position is firmly and positively held. The presser wheel or foot as shown in Figures 6 and 10 may be mounted on a plunger 35 which is slidably received in a quill 36. The plunger 35 may be provided with a reduced portion or stem 37 forming a shoulder 38 against which bears an end of a suitable spring 39 which is mounted on the stem 37. The opposite end of the spring bears against the upper end of the quill 36 and serves to press the presser resiliently against the work. The quill 36 is provided with a slot 40 extending upwardly a short distance from its lower edge. Within the slot 40 rides a pin 41 which is fixed in the plunger 35. This pin prevents the presser from turning in the quill, in order that the wheel 34 or the foot 340 will present the proper face to the work. On the upper end of the stem 37 may be screw-threaded or otherwise secured a knurled finger piece 42 which rests against the upper end of the quill 36. This finger piece may be turned to adjust the initial tension of the spring 39. The quill 36 passes through a recess in a horizontal supporting arm 43 and is secured in adjusted position as by a set screw 44. The arm 43 is also adjustably received in a bearing formed in the upper end of the standard 11. A suitable set screw 45 may be provided to hold the arm 43 fixed in adjusted position. It is obvious that by adjusting the arm 43, the quill 36 and the finger piece 42, the presser may be adjusted to engage work of any diameter within the capacity of the apparatus and may be arranged to engage it at a selected point along its axis. That is, the presser may be adjusted longitudinally of the work with respect to the position of the roller 14 which is the point of reference, or the roller 14 may be similarly adjusted with respect to the presser. The work-engaging face of the presser may be provided with a suitable slot 46. In the case of the presser wheel 34, the slot 46 extends around the periphery; in the case of the presser foot 340, it extends across the face. In both cases, it provides an opening through which the beam of light may be projected to cast the outline image of the thread at that point upon the screen.

The apparatus as a whole when used with a comparator should be securely fixed in position with reference to the optical path of the beam of light. To this end, clamping means are provided for holding the base 10 in fixed position against the table of a comparator. Such a table is provided with a groove or slot extending transverse to the direction of the beam of light. The base 10 of the mounting fixture may be provided with a block 48 having an undercut portion 49 which may be drawn tightly against an undercut side of the slot in the table to clamp the apparatus securely to the surface of the table. As shown, the block 48 has a stem 50 fixed thereto, the upper portion of the stem being threaded to receive a finger nut 51 by which the stem and block may be drawn to clamp the apparatus in place.

The operation of the apparatus as thus far described is as follows:—

The apparatus as a whole is first adjusted in suitable position on the table of a comparator by manipulating the clamp nut 51. The back rest 21 may then be adjusted to correspond to the diameter of the work which it is desired to examine. The position of the presser member is also adjusted by moving the quill 36 up or down to correspond to the diameter of the work. A master gage may then be inserted and held between the rollers 13, 14, the back rest 21 and the presser wheel 34 or foot 340. The spring 39 is preferably adjusted so that the gage springs in or out easily but is held sufficiently firmly to seat well on the rollers. Thus the work can be inserted and removed as quickly and easily as with a so-called snap gage. The set screw 20 may then be loosened and the shaft 18 moved axially, carrying therewith the fork 17, the roller 14 and the master gage which is supported on the roller 15 to such a position that the outline image of the thread of the gage which is directly beneath the slot 46 will fit the marks on the screen on which the image is projected. The set screw 20 is thereupon set up, fixing in place the roller 14 but permitting this roller to rotate. The master gage is then removed and the screws or taps to be tested are successively snapped into place on the rollers 13, 14, the presser member holding each screw in firm engagement with the rollers. As each screw is inserted, it is given a slight rotation on its axis to cause it to seat properly against the members engaging it. The image of the thread of each screw inspected will be thrown on the screen and displacement of the image on the screen with relation to the marks on the screen will indicate the extent and nature of errors in the screw thread.

When the apparatus is used as described above for measuring the diameter and pitch errors, the screw is placed in the apparatus with its entering end toward the left of the operator who normally faces the apparatus in the position indicated in Figure 1. Thus the fixed roll 14 is toward the entering end of the screw, while the movable roll 13 over which the beam of light is preferably passed is toward the head of the screw, this arrangement being customary on account of the fact that if there is a taper to the threaded portion of the screw, the smaller diameter is usually nearer the entering end of the screw. In the case of taps, however, the reverse is true. That is, the larger diameter is adjacent to the entering end and the threads usually taper slightly away from the entering end so that the first cutting thread has the largest diameter. This prevents wedging and binding in the hole which is entered by the tap. As it is desirable to throw on the screen the image of the threads of largest diameter, it is thus desirable to project the beam across the first cutting threads adjacent to the entering end of the tap. Since for the detection in pitch lead it is desirable that the beam of light be projected directly over the movable supporting roller, I therefore provide an attachment shown in Figure 8 by which the roller 14 may be released to be the movable roller, and the roller 13 may be held against axial movement. This attachment replaces the fork 17 and its shaft 18 and comprises a shaft 52 having a flat face 53 along a portion thereof against which the inner end of the set screw may engage to hold the shaft 52 in a definite angular position, but axially adjustable. On one end of the shaft 52 is fixed an arm 54 having a bearing point 55 adapted to engage the center of the end face of the roller 13 when the attachment is properly positioned. In order to permit the engagement of the bearing point 55 with the roller 13, the spring 130 must be swung aside as shown in Figure 10. The opposite end of the shaft 52 is preferably threaded as at 56 to receive a suitable nut 57 by which the arm 54 and the bearing point 55 may be drawn into firm engagement with the roller 13, this engagement being preferably such as to permit the roller 13 to rotate but to prevent any axial movement thereof. Mounted on the shaft 52 and intermediate the ends thereof is an arm 58, the end of which extends over and touches the stem 15. Secured on the upper surface of the arm 58 is a leaf spring 59 which as shown in Figures 8 and 10, is formed with an upwardly curved free end. The object of the spring 59 is to provide a yieldable stop which will not hinder the insertion of work into place in the apparatus but will engage in one of the grooves of a tap inserted in the apparatus when the tap is manually turned in its place in order to seat it correctly on the rollers 13, 14 and against the back stop 21 so that one of its threaded lands will extend upwardly as shown in Figure 10 to position the threads to be inspected at the focal plane in the path of the light beam. As shown in Figure 9, the attachment for taps clamps the roller 13 against axial movement, making this roller the fixed roller. The removal of the fork 17 from the apparatus releases the roller 14 which is thereupon free to slide axially on the stem 15. When the apparatus is used for inspecting taps, the entire device is shifted laterally to the right on the bed of the comparator in order to bring the roller 14 and the presser member (which is preferably adjusted to the left to a position directly over the roller 14) directly under and over the beam of light.

Having thus described certain embodiments of this invention, it should be evident to those skilled in the art that various modifications and changes may be made therein without departing from its spirit and scope as defined by the appended claims.

I claim:—

1. A device of the class described, comprising a frame, a plurality of rollers carried by said frame, each said roller having a peripheral portion beveled to enter a thread groove of the work, an adjustable back rest for the work carried by said frame, and a presser member supported by said frame and adapted to engage the work, the arcs of the periphery of the work between the three lines of contact by the rollers, the back rest and the presser member each being less than 180°.

2. A device of the class described, comprising a frame, means for anchoring the frame to a table, means for holding a screw to be examined, said holding means comprising a pair of spaced coaxial rollers mounted on said frame to be engaged by one side of the work, adjustable means for holding one of said rollers against axial movement without preventing rotation thereof, an independently adjustable back rest for the work, and a presser member supported by said frame to engage the work approximately opposite to the points of engagement by said rollers.

3. A device of the class described, comprising a base, a standard on said base, a pair of rollers mounted on said base on a common horizontal axis, one of said rollers being rotatable and axially movable, the other said roller being rotatable and adjustably held against axial movement, a back rest adjustable rearwardly and upwardly to engage the rearward portion of work of various diameters placed on and directly above said rollers, and a presser member adjustably supported by said standard for engaging the upper portion of work placed on said rollers.

4. In a device of the class described, a frame, and means for supporting a screw with a portion of the threaded part in a predetermined position relative to said frame, said means comprising a horizontally disposed shaft journaled in said frame for rotation and axial movement therein, a disk roller secured to said shaft for movement therewith, a perforated disk roller slidably mounted on said shaft, means for holding said perforated roller against axial movement without interfering with rotation thereof, and means for securing said holding means in adjusted position, said rollers each having a beveled peripheral edge to enter a thread groove of the work.

5. A device of the class described, comprising a frame, and means carried by said frame for holding a screw to be gaged with a portion of its threaded part in a predetermined position relative to the frame, said means being arranged to engage the screw on three small arcs spaced by substantial angles of less than 180° and comprising a pair of rollers forming the sole lower support for the screw and shaped to enter the groove of the thread, a plate elongated axially of the screw and arranged to engage the back of the screw on the thread crest, and a spring-pressed member supported by said frame from above the screw and arranged to engage the upper side of the screw on the thread crest.

6. A device of the class described, comprising a frame, and means carried by said frame for holding a screw to be gaged with a portion of its threaded part in a predetermined position relative to the frame, said means comprising a roller mounted for rotation, means for adjustably holding said roller against axial movement without preventing rotation thereof, a second roller mounted coaxial with the first and axially movable, said rollers being the sole support below said screw, a back rest arranged to engage said screw on the thread crest thereof and over a small arc to hold said screw against rearward movement, and a presser wheed supported from above said screw and arranged to engage said screw at points nearly opposite the points of engagement by the rollers.

7. In a device of the class described, a frame and means for holding a screw with a portion of its threaded part in a predetermined position relative to the frame, said means comprising rollers mounted on said frame, said rollers having peripheral edges shaped to enter a thread groove of the work, means for holding one of said rollers against axial movement, a back rest for said work, a presser member mounted above said rollers and movable toward and from work placed on the rollers, and means resiliently pressing the presser member toward the work.

8. In a device of the class described, a frame and means for holding a screw with a portion of its threaded part in a predetermined position relative to said frame, said means comprising a back rest arranged to engage the rear surface of the work, said back rest having a rearwardly and upwardly extending rack secured thereto, a pinion meshing with said rack, a shaft carrying said pinion, a head fixed on said shaft, scale marks on said head, and means for securing said shaft in adjusted position.

9. In a device of the class described, a frame and means for holding a screw to be gaged horizontally with a portion of its threaded part in a predetermined position relative to said frame, said means comprising a pair of disk rollers on which said screw may rest, a narrow elongated plate extending axially of the screw and adjustable upwardly and rearwardly to engage the thread crest of the screw when inserted in the device and to stop the screw directly over the supporting rollers, and an adjustable spring-pressed member supported from above the screw and arranged to engage said screw at a point slightly forward of the top of the screw.

10. In a device for holding a screw to be gaged, a frame, a shaft mounted on said frame for limited axial movement, a roller fixed on said shaft and coaxial therewith, a second roller slidably mounted on said shaft and coaxial therewith, means resiliently opposing axial movement of said shaft and the roller fixed thereon, and means for preventing axial movement of said second roller, said preventing means comprising a notched member movable to fit over a portion of the periphery of said second roller and means for adjustably fixing said notched member with reference to said frame.

In testimony whereof I have affixed my signature.

ROBERT O. BEARDSLEY.